(12) United States Patent
Lerro

(10) Patent No.: US 12,165,232 B1
(45) Date of Patent: Dec. 10, 2024

(54) SYSTEM AND METHOD FOR MANAGING LITIGATION SUPPORT SERVICES

(71) Applicant: The Depo App Company, Philadelphia, PA (US)

(72) Inventor: Raymond E. Lerro, Philadelphia, PA (US)

(73) Assignee: The Depo App Company, Philadelphia, PA (US)

( * ) Notice: Subject to any disclaimer, the term of this patent is extended or adjusted under 35 U.S.C. 154(b) by 0 days.

(21) Appl. No.: 17/147,707

(22) Filed: Jan. 13, 2021

Related U.S. Application Data

(60) Provisional application No. 62/960,439, filed on Jan. 13, 2020.

(51) Int. Cl.
| | | |
|---|---|---|
| *G06Q 50/00* | (2024.01) | |
| *G06Q 10/00* | (2023.01) | |
| *G06Q 10/1093* | (2023.01) | |
| *G06Q 50/18* | (2012.01) | |

(52) U.S. Cl.
CPC ......... *G06Q 50/18* (2013.01); *G06Q 10/1093* (2013.01)

(58) Field of Classification Search
CPC .................... G06Q 50/18; G06Q 10/1093
See application file for complete search history.

(56) References Cited

U.S. PATENT DOCUMENTS

| | | | |
|---|---|---|---|
| 6,662,194 B1 | 12/2003 | Joao | |
| 7,502,747 B1 | 3/2009 | Pardo et al. | |
| 2003/0144862 A1* | 7/2003 | Smith | G06Q 10/10 705/321 |
| 2007/0300225 A1* | 12/2007 | Macbeth | G06Q 10/10 718/100 |
| 2014/0357177 A1* | 12/2014 | Stewart, Jr. | F16M 13/027 454/258 |
| 2018/0150927 A1* | 5/2018 | Rickey | G06Q 10/063114 |
| 2019/0043020 A1* | 2/2019 | Donofrio | G06V 30/153 |
| 2019/0095882 A1 | 3/2019 | Parker | |
| 2020/0045501 A1* | 2/2020 | Fox | H04W 4/025 |
| 2020/0111042 A1* | 4/2020 | Pham | G06N 20/20 |

FOREIGN PATENT DOCUMENTS

| | | |
|---|---|---|
| KR | 20020063340 | 8/2002 |
| KR | 20200023259 | 3/2020 |
| WO | 2019039814 | 2/2019 |
| WO | 2019229500 | 12/2019 |
| WO | 2020140038 | 7/2020 |

* cited by examiner

*Primary Examiner* — Matheus Ribeiro Stivaletti
(74) *Attorney, Agent, or Firm* — Lowenstein Sandler LLP

(57) ABSTRACT

Embodiments of the present disclosure related to systems and methods of managing litigation support services. In one embodiment, a method comprises receiving, from a user device, one or more requests related to litigation support services, the one or more requests specifying a litigation-related event and associated scheduling information; receiving an indication of acceptance of one or more of the requests from one or more user devices associated with litigation support service providers; and transmitting, to the user device, the indication of acceptance.

17 Claims, 7 Drawing Sheets

SYSTEM AND METHOD FOR MANAGING LITIGATION SUPPORT SERVICES

CROSS-REFERENCE TO RELATED APPLICATION(S)

The present application claims the benefit of priority of U.S. Provisional Patent Application No. 62/960,439, filed on Jan. 13, 2020, the disclosure of which is hereby incorporated by reference herein in its entirety.

TECHNICAL FIELD

The present disclosure relates to systems and methods for managing services, and in particular to a management platform for hiring litigation support service providers and scheduling litigation support services.

BACKGROUND

Litigation-related events, such as depositions, generally require the support of service providers, such as court reporters, videographers, and interpreters. In addition, the attorneys performing depositions occasionally need the assistance of those same service providers in the court room during trials. Coordinating the schedules of the individuals involved so that they can be in the room at the right time for a deposition is an arduous coordination task due to the variability of civil legal proceedings and the unforeseen nature of scheduling conflicts. The courts, the lawyers, and the service providers have addressed this issue thus far by hobbling together disparate systems, incongruent data sources, and management technologies that are not designed for these purposes and require personal oversight over all facets of the process. The lack of an effective means to organize, analyze, manage, and coordinate data in a centralized fashion coupled with human error has resulted in a highly ineffective process resulting in wasted money, time, and effort.

SUMMARY OF THE DISCLOSURE

The following presents a simplified summary of various aspects of the present disclosure in order to provide a basic understanding of such aspects. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one aspect of the present disclosure, a method of managing litigation support services comprises: receiving, from a user device, one or more requests related to litigation support services, the one or more requests specifying a litigation-related event and associated scheduling information; receiving an indication of acceptance of one or more of the requests from one or more user devices associated with litigation support service providers; transmitting, to the user device, the indication of acceptance; and transmitting, to the one or more user devices associated with litigation support service providers, information pertaining to the litigation-related event that was not included in the original one or more requests.

In some embodiments, the litigation support service providers are selected from a group consisting of court reporters, videographers, video technicians, interpreters, and scopists.

In some embodiments, the method further comprises: transmitting, to the user device, information descriptive of a geographic location of the one or more litigation support service providers with respect to a geographic location of the litigation-related event.

In some embodiments, the method further comprises: generating, based at least partially on the information pertaining to the litigation-related event, a pre-populated read-on form for at least one of the litigation support service providers; and transmitting the pre-populated read-on form to the respective user device of the at least one of the litigation support service providers to be displayed by the user device during the litigation-related event.

In some embodiments, the method further comprises: detecting an update to data associated with the litigation-related event; and transmitting in real time the updated data to the user device and/or the user devices associated with the litigation support service providers.

In some embodiments, the one or more requests are transmitted to one or more user devices associated with litigation support service providers based on a compatibility score computed for each of the litigation support service providers.

In some embodiments, the method further comprises transmitting to the user device one or more deliverables generated by the litigation support service providers.

In another aspect of the present disclosure, a method comprises: receiving information descriptive of a litigation-related event; identifying service providers available to accept a request to participate in the litigation-related event; generating a list of recommended service providers based on the list of available service providers; and transmitting the list of recommended service providers to the scheduling user. In some embodiments, the method comprises: receiving an indication from a user device of a service provider indicating cancelation of the service provider's participation in the litigation-related event; computing a timing score for each service provider in the list of recommended service providers; sorting the list of recommended service providers based on the timing score; and transmitting a request to a service provider having a superior timing score compared to the remaining service providers in the list of recommended service providers. In some embodiments, the list of recommended service providers is generated based on a compatibility score computed for each of the available service providers. In some embodiments, the method further comprises: building a habit profile for one or more service providers and/or one or more scheduling users, wherein computing the timing score for each service provider comprises computing the timing score based at least in part on a habit profile of the respective service provider and/or a habit profile of the scheduling user.

In another aspect of the present disclosure, a system comprises a memory and a processing device operatively coupled to the memory. The processing device is configured to perform any implementation of the methods described above.

In another aspect of the present disclosure, a non-transitory computer-readable medium has instructions stored thereon that, when executed by a processing device, cause the processing device to perform any implementation of the methods described above.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

Figure 1:
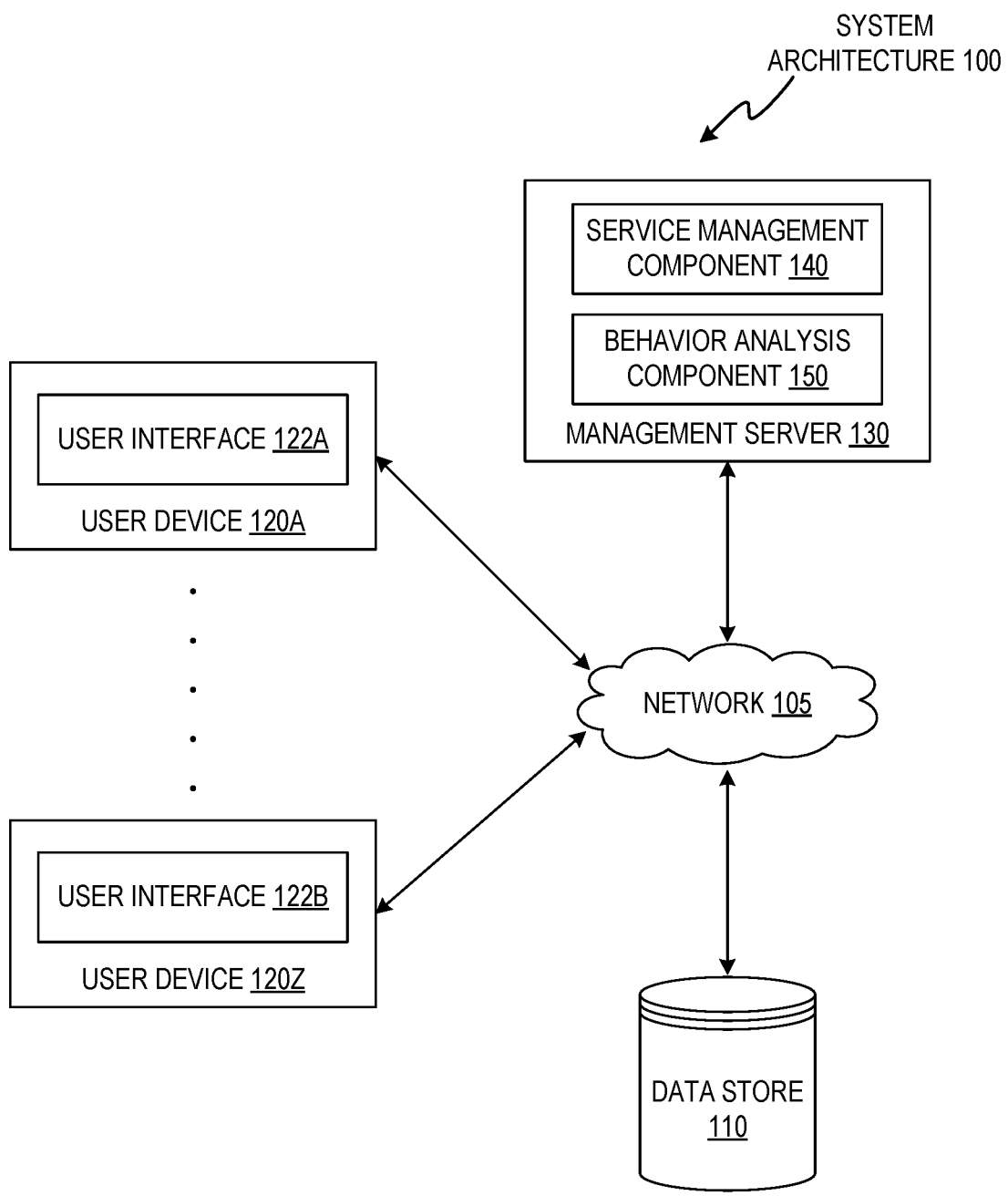
FIG. 1 is a block diagram illustrating an exemplary system architecture in accordance with embodiments of the present disclosure.

Described herein are embodiments for managing services pertaining to litigation-related events, referred to herein as "litigation support services." Litigation-related events may include, but are not limited to depositions, arbitrations, mediation proceedings, courtroom support, captioning services, independent medical examinations, expert testimonies, "day in the life" videos, virtual reality re-enactments, on-site shoots to document environments, or other activities related to civil or criminal litigation. The embodiments may be implemented in connection with a software platform that can be implemented on mobile devices and computers to improve, for example, the efficacy and organization of litigation-related event scheduling in real time to reduce costs, streamline the process, and create a centralized data system for analysis, organization, and reporting of associated data. The software platform benefits the parties ordering litigation-related services with cost savings, improved turnaround times on deliverables, and data analysis and management capacity not currently available. The service providers (who may include freelancers, independent contractors, small companies, agencies, or other individuals or groups of individuals providing professional services in the legal field) using the software platform benefit from increased earning capacity, better time management and usage, more work opportunities, and data analysis and management tools not currently available through conventional systems. The application eliminates breakdowns in communication from human error, analyzes data in order to improve or optimize time management, and organizes information for service providers and those desiring services for their litigation-related events.

Certain embodiments herein implement a "just-in-time" scheduling algorithm that matches, for example, lawyers with service providers to ensure or improve the likelihood that the lawyer is not without a service provider at the time that the litigation-related event is to begin. The scheduling algorithm further allows for service providers to improve or optimize their earning capacity and reduce or minimize unused time in their schedules by forecasting demand, optimizing schedules, and matching highly compatible service providers with lawyers. For example, the algorithm identifies service providers to recommend for unassigned roles based on, for example, compatibility scores and timing scores that are derived from, but not limited to, characteristics related to the service providers' performance metrics, experience with particular lawyers, and the timing habits of both service providers and lawyers.

The embodiments further enable real time synchronization of data to the cloud for faster turnaround time on deliverables. In addition, the embodiments enable organizations to allocate service provider resources to different members of their organization seamlessly and without the need to call or speak with an individual. The embodiments also allow service provider organizations to create an inventory platform to track equipment being used by their subcontractors. The embodiments advantageously reduce costs and loss of time and efforts of all individuals and organizations involved in litigation-related events. Further, individuals using the systems and methods described herein will also be able to use the scheduling data and other generated data to produce financial, management, and coordination reports that will allow for consistent improvement. The presentation of data to individuals using the platform is streamlined to display relevant information in an efficient manner.

In the description that follows, reference is made to litigation support services for purposes of illustrating implementation of the embodiments described herein. It is to be understood that the embodiments described herein are not limited to use in any one particular application or environment and that changes may be made to the disclosed implementations without departing from the spirit and scope of the disclosure. Although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes outside of the legal context.

Exemplary implementations of the embodiments described herein are now described. FIG. 1 illustrates an exemplary system architecture 100, in accordance with embodiments of the present disclosure. The system architecture 100 includes a data store 110, user devices 120A-120Z, and a management server 130, with each device of the system architecture 100 being communicatively coupled via a network 105. One or more of the devices of the system architecture 100 may be implemented using a generalized computer system 700, described below with respect to FIG. 7. The devices of the system architecture 100 are merely illustrative, and it is to be understood that additional data stores, user devices, management servers, and networks may be present.

In one embodiment, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Although the network 105 is depicted as a single network, the network 105 may include one or more networks operating as stand-alone networks or in cooperation with each other. The network 105 may utilize one or more protocols of one or more devices to which they are communicatively coupled.

The user devices 120A-120Z may include a computing device such as a personal computer (PC), laptop, mobile phone, smart phone, tablet computer, netbook computer, etc. User devices 120A-120Z may also be referred to as a "client device" or "mobile device." An individual user may be associated with (e.g., own and/or operate) one or more of the user devices 120A-120Z. One or more of the user devices 120A-120Z may also be owned and utilized by different users at different locations. As used herein, a "user" may be represented as a single individual. However, other embodiments of the present disclosure encompass a "user" being an entity controlled by a set of users and/or an automated source. For example, a set of individual users federated as a community in a company or government organization may be considered a "user." Users may include administrators and standard users (i.e., users without administrative privileges). In some embodiments, in the context of litigation support services, users may include lawyers, paralegals, litigants, court reporters, videographers, video technicians, interpreters, scopists, legal document assistants, and any other individuals or groups of individuals that may be associated with a litigation or provide litigation support services. For example, in one embodiment, a first user of the user device 120A may be a lawyer who is seeking to hire a videographer, and the second user of the user device 120B may be a videographer offering their services to assist in a litigation-related event. As another example, a third user of the user device 120C may be a court reporter, and a fourth user of the user device 120D may be a scopist offering their services to assist a court reporter in a litigation-related event.

The user devices 120A-120Z may each utilize one or more local data stores, which may be internal or external devices, and may each include one or more of a short-term memory (e.g., random access memory), a cache, a drive (e.g., a hard drive), a flash drive, a database system, or another type of component or device capable of storing data. The local data stores may also include multiple storage components (e.g., multiple drives or multiple databases) that may also span multiple computing devices (e.g., multiple server computers). In some embodiments, the local data stores may be used for data back-up or archival purposes.

The user devices 120A-120Z may implement user interfaces 122A-122Z, respectively, which may allow each respective user device to send/receive information to/from other user devices, the data store 110, and the management server 130. Each of the user interfaces 122A-122Z may be a graphical user interface (GUI). For example, the user interface 122A may be a web browser interface that can access, retrieve, present, and/or navigate content (e.g., web pages such as Hyper Text Markup Language (HTML) pages) provided by the management server 130. In one embodiment, the user interface 122A may be a standalone application (e.g., a mobile "app," etc.), that enables a user to use the user device 120A to send/receive information to/from other user devices, the data store 110, and the management server 130.

In some embodiments, one or more of the user interfaces 122A-122Z may implement a mobile app that allows their respective user devices to interact with the management server 130. In some embodiments, the mobile app includes a sequence of screens presented to the user which are navigable by selecting available options within each screen.

In some embodiments, the application is configured to display different options and information depending on the type of user (e.g., a lawyer organizing a deposition will see on his/her device different options and information than a videographer will see on his/her device). Examples of user types are described below with respect to FIG. 2. In some embodiments, one or more of the user interfaces 122A-122Z accesses a website that allows their respective user devices to interact with the management server 130.

In one embodiment, the management server 130 provides a platform for managing litigation services, and may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components from which digital contents may be retrieved. In some embodiments, the management server 130 may be a server utilized by any of the user devices 120A-120Z to retrieve/access content or information pertaining to litigation services and scheduling. In some embodiments, additional management servers may be present.

In some embodiments, the management server 130 may implement a service management component 140 that manages hiring requests, scheduling, and organization pertaining to litigation-related events. Data transmitted to the user devices 120A-120Z and presented to users may be updated in real time, meaning that updated data will be transmitted to a user device within a short time of the update (e.g., within 5 minutes, within 1 minute, in less than a minute). Updates may be pushed to user devices 120A-120Z by the management server 130 after detecting an update to data associated with a litigation-related event. For example, in response to an update in scheduling information, such as location data, time and date data, indications of availability, cost estimates, etc., the service management component 140 may transmit updated data to user devices of all users associated with the event. In some embodiments, notifications of updates may also be provided concurrently. Further functionality of the management server 130 is described with respect to the FIGS. 2-6.

In some embodiments, the management server 130 may implement a behavior analysis component 150 to analyze and model the behavior of various users based on their past and current interactions with the platform implemented by the management server 130. The behavior analysis component 150 may be used to generate "habit profiles" of its various users to model and predict their behavior. Habit profiles may be utilized by the service management component to, for example, improve upon or optimize the matching of service providers to litigation-related events, to improve upon or optimize the scheduling associated with litigation-related events, and to predict metrics pertaining to individual users including likelihood of cancelation, likelihood that a scheduled event will exceed the requested time duration, and other metrics. In some embodiments, the habit profile may be used to predict how long a litigation-related event is likely to last compared to the expected duration specified by the user scheduling the event based on that user's prior habits of deviating from their own expectations. Such information may be used to adjust predicted costs (e.g., higher prices quotes for events that are likely to be longer than expected), as well as to determine whether the event can feasibly fit into the schedule of service providers. Habit profiles may also be used to predict the likelihood of cancelation by a particular service provider to avoid a situation where the litigation-related event is imminent and roles are not fully assigned.

In some embodiments, a baseline habit profile may be generated and used for users that are new to the platform and/or historical behavior data for that user is limited or missing. Such baseline habit profiles may be representative of the habits of other users with similar characteristics, such as users with similar geographic locations, similar skills (e.g., role-specific skills for service providers), similar law practices (e.g., for users that are lawyers), similar experience levels (in terms of years of experience), etc. For a given user for which a baseline habit profile has been generated, the habit profile may be updated as the user interacts with the platform to account for their actual behavior, and then, in some embodiments, may be eventually be replaced by a habit profile generated solely from their individual behaviors.

In some embodiments, the behavior analysis component 150 may implement one or more machine learning models to build and update habit profiles. For example, the machine learning model may utilize supervised or unsupervised models to generate and apply classifications representative of various traits of the users, and/or to generate regression models to predict numerical deviations based on past behavior (e.g., predicted costs for services, predicted durations of litigation-related events, etc.). The machine learning model(s) may utilize models comprising, e.g., a single level of linear or non-linear operations, such as a support vector machine (SVM), or a deep neural network (i.e., a machine learning model that comprises multiple levels of linear or non-linear operations). For example, a deep neural network may include a neural network with one or more hidden layers. Such machine learning models may be trained, for example, by adjusting weights of a neural network in accordance with a backpropagation learning algorithm.

In some embodiments, each machine learning model may include layers of computational units ("neurons") to hierarchically process data, and feed forward the results of one layer to another layer so as to extract a certain feature from the input. When an input vector is presented to the neural network, it may be propagated forward (e.g., a forward pass) through the network, layer by layer (e.g., computational units) until it reaches an output layer. The output of the network can then be compared to a desired output (e.g., a label), using a loss function. The resulting error value is then calculated for each neuron in the output layer. The error values are then propagated from the output back through the network (e.g., a backward pass), until each neuron has an associated error value that reflects its contribution to the original output.

In some embodiments, the behavior analysis component 150 may utilize a training engine to train one or more machine learning models. For example, in some embodiments, the training data may include a subset of historical user behavior data or litigation-related event outcome data. In some embodiments, the training engine may utilize a neural network to train the one or more machine learning models, for example, using a full training set of data multiple times. Each cycle of training is referred to as an "epoch." For example, each epoch may utilize one forward pass and one backward pass of all training data in the training set. In some embodiments, the behavior analysis component 150 may identify patterns in training data that map the training input to the target output (e.g., a particular behaviors or likelihoods of particular behaviors of the various users).

In some embodiments, a training data generator may also use additional machine learning models to identify and add labels for outcomes based on the training data. The training data generator may utilize a label detector component to detect and generate the labels for the outcomes. The label detector component may also be independent of the training data generator and feed the results to the training data generator. The label detector component may use a machine learning algorithm such as, for example, a neural network, a random decision forest, an SVM, etc., with the training set to detect outcomes. In some embodiments, an NLP model may be used to extract labels from unstructured textual data (e.g., user reviews/ratings, reasons for cancelation of lawyers/freelancers, etc.). The machine learning model(s) may learn the patterns from the features, values, and known outcomes and be able to detect similar types of outcomes when provided with comparable sets of features and corresponding values. In some embodiments, once the label detector component is sufficiently trained, the label detector may be provided with the features that are made available using the training data generator. The label detector may detect an outcome using the trained machine learning model and produce a label that is to be stored along with the training data set for the associated machine learning model(s). In some embodiments, once the outcomes are detected and labels are generated and added for the features and corresponding values, the training data set for the machine learning models may be complete with both inputs and outputs such that the machine learning model(s) may be used to generate habit profiles utilized downstream by the service management component 140.

In one embodiment, the data store 110 may include one or more of a short-term memory (e.g., random access memory), a cache, a drive (e.g., a hard drive), a flash drive, a database system, or another type of component or device capable of storing data. The data store 110 may also include multiple storage components (e.g., multiple drives or multiple databases) that may also span multiple computing devices (e.g., multiple server computers). In some embodiments, the data store 110 may be cloud-based. One or more of the devices of system architecture 100 may utilize their own storage and/or the data store 110 to store public and private data, and the data store 110 may be configured to provide secure storage for private data. In some embodiments, the data store 110 may be used for data back-up or archival purposes.

In some embodiments, the data store 110 includes a relational database configured to store information describing individuals/organizations who have accounts associated with the service management component 140, such as lawyers, legal assistants, freelancers, and agencies. In some embodiments, the relational database is a MySQL or SQL Server database. In some embodiments, the relational database is at least partially deployed by a cloud server, such as the Amazon Relational Database Service.

In some embodiments, the relational database includes one or more tables such as, but not limited to: a table describing primary roles of users; a table describing predefined data for types of payments; a table describing user payment settings; a table describing predefined data for user types; one or more tables describing litigation-related events, the status of such events, and the types of events; a table describing service provider status; a table defining user privileges for administrators; a table describing attorney roles (e.g., direct examination or cross examination); a table describing user info (e.g., name, contact info, user type such as scheduling user and/or service provider, etc.); a table that links users with other users, for example, to help identify whether the relationship is a preferred relationship (e.g., one user indicates a preferred relationship with another) or a blocked relationship (e.g., one user blocks another user so as to not receive requests or communications from the other user); a table describing profile information of individuals/ organizations associated with a law practice, such as lawyers, law firms, and legal assistants; a table describing lawyers assigned to legal assistant users; a table describing service provider rates, deliverable offers, rate histories, and histories of deliverable offers; a table describing service provider requirements and assignments; a table describing all service providers who had been assigned to a particular litigation-related event and then canceled; a table describing all litigation-related event start and end logs for service providers; a table describing lawyers to whom service provider deliverables are to be sent; a table describing all service provider delivery documents; a table describing all service providers to whom a litigation-related event job request has been sent; a table describing service provider/ scheduling user cancelations and reasons for cancelation; a table describing, for example, lawyer and freelancer reviews; a table describing service provider blocked dates; a table describing payment status, which may be utilized in service provider invoices; and a table describing supporting personnel.

Although each of the data store 110, the user devices 120A-120Z, and the management server 130 are depicted in FIG. 1 as single, disparate components, some of these components may be implemented together in a single device or networked in various combinations of multiple different devices that operate together. In some embodiments, some or all of the functionality of the management server 130 may be performed by one or more of the user devices 120A-120Z, or other devices that are under control of the management server 130.

Figure 2:
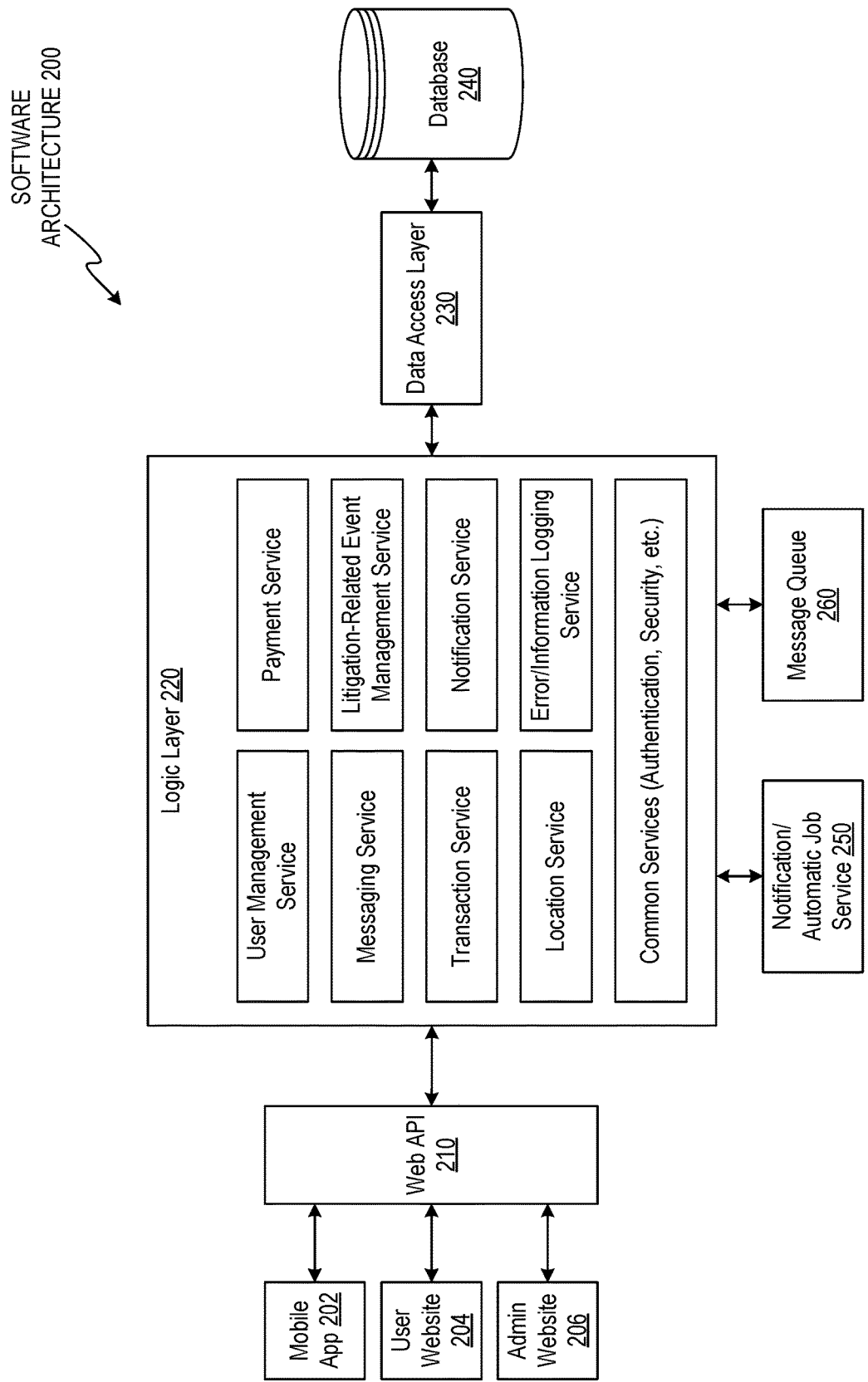
FIG. 2 is a block diagram illustrating an exemplary software architecture in accordance with embodiments of the present disclosure.

FIG. 2 is a block diagram illustrating an exemplary software architecture 200 in accordance with embodiments of the present disclosure, which may be representative of some or all of the functionality of the service management component 140. The software architecture 200 includes implementations of a mobile app 202 (for use by users and administrators), a user website 204 (for use by users), and an administrator website 206 (for use by administrators), which may each be implemented in a user interface 122A-122Z. User devices (e.g., user devices 120A-120Z) may interact with a logic layer 220 via a web application program interface (API) 210. The logic layer 220 represents the core functionality of the litigation management services provided to the various users. The logic layer 220 may be configured to perform services including, but limited to a user management service, a messaging service, a transaction service, a location service, a payment service, a litigation-related event management service, a notification service, an error/information logging service, as well as various common services including authentication services, security services, etc. The logic layer 220 may interact with a database 240 (e.g., a database stored in and maintained by the data store 110) via a data access layer 230 (which may utilize MySQL to query and store data in the database 240). In some embodiments, the logic layer 220 may further utilize a notification/automatic job service 250 and a message queue 260 for dispatching messages. In some embodiments, the notification/ automatic job service 250 continuously monitors the message queue 260, and will process messages based on message type whenever a new message is added to the message queue 260, as well as send email or push notifications to recipients.

In some embodiments, the location service may implement a location tracking algorithm to compute estimated times of arrival for service providers based on their locations (e.g., as determined via global position system (GPS) data obtained from their respective user devices). Such data may be used for the purposes of scheduling in order to determine how estimate how much time is required for the service provider to travel to the location of the litigation-related event. In some embodiments, the user who schedules the litigation-related event and is seeking to fill the roles of the litigation-related event (referred to herein as a "scheduling user," who may be a lawyer, paralegal, or supporting staff) may receive notifications in real-time indicating the proximity of a given service provider (by pinging the user device of the service provider) when the service provider is en route to the litigation-related event. The time between pings is referred to as a "ping interval," which may be 30 seconds, 1 minute, 5 minutes, etc. In some embodiments, the ping interval may decrease as the time until the beginning of the litigation-related event decreases.

In some embodiments, the logic layer 220 allows users to set up payment options during an onboarding process or at a later time. Users who are lawyers may be required to set up payment information prior to generating a record for a new litigation-related event. Service providers may be required to set up payment information prior to receiving requests to participate in litigation-related events. In some embodiments, the logic layer 220 enables the sending of invoices, the processing of invoices, and the management of billing disputes. In some embodiments, the logic layer 220 further allows for the transmittal and storage of electronic deliverable materials produced by service providers.

An administrator is a type of user who has superior privilege levels compared to standard users. In some embodiments, an administrator will be presented with an administrator interface that allows the administrator, depending on their privilege level, to perform one or more of the following actions: editing/updating typical information of users, such as name and contact information; editing/ updating user charge rates and other profile build fields; editing/updating payment bills; activating, deactivating, or deleting other user accounts; granting inferior administrative privileges to other users; generating/updating records for litigation-related events; or editing settings and setting premium rates. The user interface for an administrator may provide a dashboard view where the administrator can see user management options, lists of scheduled litigation-related events, disputes among users, invited users, reasons for rejections by service providers, support requests, escalation options, and options for managing other administrators. In some embodiments, when a scheduling user attempts to generate a record of a litigation-related event, a notification may be sent to an administrator to approve the record creation.

In some embodiments, there are different levels of administrative privileges that an administrator may have. A Level 1 administrator, for example, may be allowed to edit typical information of users, including name, contact information, etc. A Level 2 administrator may further be allowed to edit user charge rates and other profile build fields, manage the storage of deliverables, create new litigation-related event records, and edit existing litigation-related event records. A Level 3 administrator may further be allowed to edit user payment bills and edit financial disputes. A Level 4 administrator may further be allowed to activate, deactivate, or delete user accounts.

At the time of account setup, standard users may designate a user type for their account, and one or more roles as a subset of the designated user type. In some embodiments, standard users may be one of two different user types. The first type of standard user includes scheduling users. Scheduling users may further be classified into one or more roles including, but not limited to, lawyers, legal assistants, or other legal personnel. Scheduling users can utilize the mobile app 202 or the user website 204 to create records of litigation-related events for which suitable service providers can be hired. Such records include may include details such as, but not limited to: lawyers (names and associated law firms), time and date of the litigation-related event; type of event (e.g., deposition, arbitration, etc.), expected duration, location, case no., case name, the court hearing the case, witness name and contact information, attorney type (direct examination or cross examination), whether the event needs to be expedited (including the number of days it needs to be expedited by), type of service provider roles that need to be assigned, and associated documents (e.g., a Notice of Deposition).

The scheduling user can review profiles of service providers and their estimated costs prior to requesting service providers. While creating the record of the litigation-related event, the scheduling user can indicate their preferred service providers. In some embodiments, service providers can also be selected from the existing pool of service providers manually (e.g., a lawyer transmits a job request to a specific freelancer or group of freelancers) or automatically (e.g., the service management component automatically identifies freelancers to whom job requests are sent). In some embodiments, a job request may expire if the recipient does not respond within a predetermined amount of time (e.g., 30 minutes, 1 hour, etc.). Scheduling users may also be able to view scheduled litigation-related events, edit their details, view their deliverables, review payment details, submit payments, and edit their profile information.

The scheduling user may be presented with a dashboard (e.g., presented by the mobile app 202 or the user website 204) which provides information on upcoming litigation-related events, including the date, expected duration, case information, etc. The information may further identify service providers who have accepted/been assigned to the particular event, and their respective roles. For unassigned roles, an indication of "unassigned" may be presented. The dashboard may also allow the scheduling user to schedule an event and generate job requests for specific service providers, as well as specify role-dependent requirements for those service providers (e.g., equipment requirements for videographer, language requirements for interpreter, etc.). The dashboard may further provide a breakdown of estimated charges for each service provider, which may include a cancelation charge in the event that the scheduling user no longer wishes to use that service provider or the scheduling user cancels the litigation-related event. The dashboard may further allow the scheduling user to block particular service providers from receiving job requests and generate a list of favorite/preferred service providers.

The second type of standard user includes litigation support service providers (e.g., freelancers, agencies, etc.), who receive job requests via the service management component 140. Service providers can review details of job requests prior to accepting the job request, as well as view and edit their respective calendars/schedules. Service providers can further view details regarding required deliverables, upload deliverables, view invoices, edit personal information, and send notifications to cancel their participation in litigation-related events.

In some embodiments, users designated as service providers may be further have designated role types based on their expertise, including, but not limited to, court reporter, videographer, video technician, interpreter, and scopist. In some embodiments, service providers may be able to perform multiple roles (e.g., a user that can work as both a video technician and a videographer). Depending on the role, service providers may be presented with different options and information requirements in their respective user interfaces, including, but not limited to, role-specific functionality and technical requirements (e.g., number of microphones needed by videographer, languages to read for an interpreter, languages to speak for an interpreter, required or preferred conference tools for video technician, etc.). The service provider may specify their technical capabilities pertaining to the services that they offer, which may be searchable by the scheduling user when seeking service providers for assignment to a role. The service provider may also specify estimated charges for their services, limitations on travel mileage, chargeable mileage ranges, and other options.

In some embodiments, certain service providers may also be able to act as scheduling users. For example, service providers having a court reporter role type may be provided with the functionality to send job requests to scopists, who generally work under the supervision of court reporters. Similar to the case of a lawyer seeking to hire a court reporter for a litigation-related event, the court reporter may seek to hire a scopist using the methodologies described herein. The court reporter may indicate preferred scopists, and may manually request scopists or have the service management component 140 automatically requests scopists.

FIGS. 3, 4, 5, and 6 are flow diagrams illustrating various methods 300, 400, 500, and 600, respectively, for managing litigation support services in accordance with embodiments of the present disclosure. The various methods may be performed by processing logic that includes hardware (e.g., circuitry, dedicated logic, programmable logic, microcode, etc.), software (e.g., instructions run on a processing device to perform hardware simulation), or a combination thereof. In some embodiments, one or more of the various methods are performed by (or at least partially by) a processing device of the management server 130 described above with respect to FIG. 1 implementing some or all of the functionality of the service management component 140 and/or the behavior analysis component 150.

Figure 3:
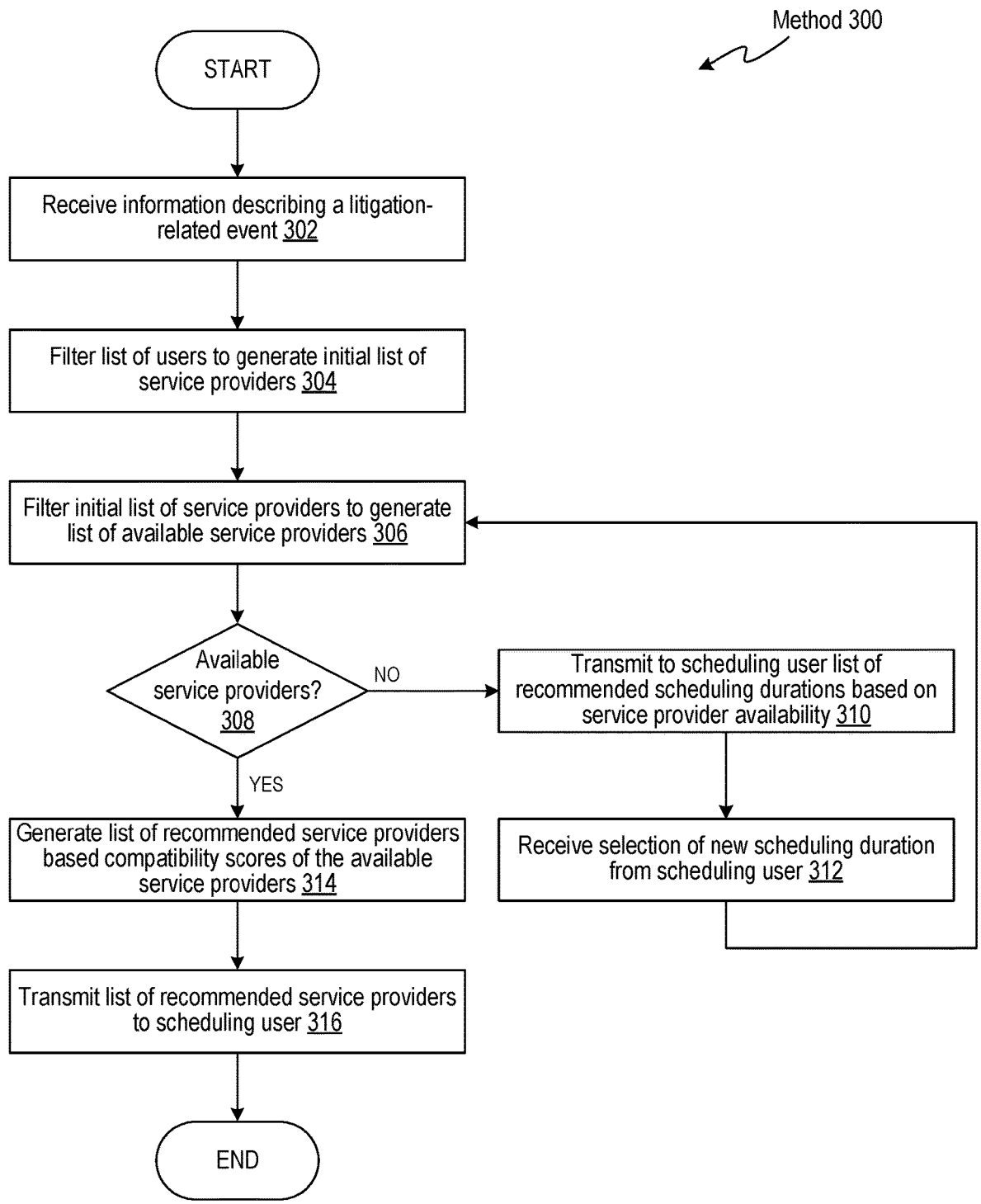
FIG. 3 is a flow diagram illustrating a method of identifying recommended service providers for scheduling a litigation-related event in accordance with embodiments of the present disclosure.

FIG. 3 is a flow diagram illustrating a method 300 of identifying recommended service providers for scheduling a litigation-related event in accordance with embodiments of the present disclosure.

At block 302, a processing device (e.g., of the management server 130) receives information describing a litigation-related event. The information may be entered by a user designated as a scheduling user via their respective device (e.g., one of the user devices 120A-120Z implementing, for example, the mobile app 202). The information entered may comprise, for example, one or more of a type of event (e.g., deposition, arbitration, etc.), expected duration, location, case no., case name, court hearing the case, witness name and contact information, attorney type (direct examination or cross examination), whether the event needs to be expedited (including the number of days it needs to be expedited by), type of service provider roles that need to be filled, and associated documents (e.g., a Notice of Deposition). In some embodiments, the processing device may also receive an indication of a preferred service provider for a particular role and a maximum price that the scheduling user is willing to pay for the services.

At block 304, the processing device filters a list of users to generate an initial list of service providers, for example, by selecting users designated as service providers.

At block 306, the processing device filters the initial list of service providers to generate a list of available service providers. The processing device may filter the initial list of service providers based on one or more of the following criteria: selecting users that are not blocked by the scheduling user; selecting users for which payment information has been submitted; selecting service providers having a role type other than scopists (unless, in some embodiments, the scheduling user is a user with a court reporter role); selecting users that are available for hire during the duration of the litigation-related event; selecting users that have not already rejected the litigation-related event job request; selecting service providers within a predefined geographic range of the litigation-related event; selecting service providers that meet technical or skill requirements (e.g., an interpreter must be able to understand and speak a particular language); or selecting service providers that meet a predefined review/rating threshold (e.g., only service providers having a "three-star" or higher rating).

At block 308, the processing device determines whether service providers are available to fill each required role for the litigation-related event. If at block 380 the processing device determines that service providers are not available to fill each required role type (e.g., service providers are available to fill a videographer role but not an interpreter role), then the method 300 proceeds to block 310 where the processing device generates a list of recommended scheduling durations based on data descriptive of service provider availability.

At block 312, the processing device may receive a selection of a new scheduling duration from the scheduling user for which the litigation-related event is to occur. The method 300 may then proceed back to block 306 where the processing device filters the initial list of service providers to generate a list of available service providers based on the newly selected scheduling duration.

In some embodiments, the scheduling user may opt to schedule the litigation-related event during the originally-selected duration despite one or more roles for which no service providers are available.

If at block 308 the processing device determines that service providers are available for each of the required roles of the litigation-related event, then the method 300 proceeds to block 314, where the processing device generates, for each role type to be assigned, a list of recommended service providers based on compatibility scores computed for each service provider in the list of available service providers. In some embodiments, one or more services providers may be included in one or more lists of recommended service providers when such service providers can perform multiple roles.

In some embodiments, the compatibility score is a measure of how suitable a particular service provider is for a particular role in a particular litigation-related event. In some embodiments, the compatibility score accounts for the service provider's past performance as well as missed opportunities (e.g., due to cancelations by scheduling users) in order to improve or optimize the service provider's earning capacity while also providing high-quality recommendations of service providers to scheduling users. In some embodiments, the processing device computes the compatibility score for each available service provider based on various scoring criteria, which may be computed, for example, by adding points to each service provider based on the criteria. Points may be added to a service provider's compatibility score based on, but not limited to, one or more of the following criteria: whether or not the service provider has been indicated as a preferred service provider by the scheduling user; how recently, if at all, the service provider's scheduled services were canceled by a scheduling user of another litigation-related event (e.g., so as to increase the opportunities for service providers whose jobs were recently canceled); proximity of the service provider's costs to the scheduling user's preferred costs; the reviews/ratings of the service provider; a number of jobs performed by the service provider over a fixed time duration, with a higher number of points being given to service providers who have had less jobs; or cancelation and/or rejection frequency, with more points being awarded to service provides who cancel infrequently or accept job requests more frequently. The amount of points awarded for any given criterion and the range of possible points that can be awarded may be manually adjusted or, in some embodiments, automatically adjusted based on a machine learning algorithm utilizing, for example, the point values as outputs and the outcomes of the transactions (e.g., satisfaction rating by the scheduling user, satisfaction rating by the service providers, profitability of service providers, etc.) of as inputs.

In some embodiments, the list of recommended service providers for a particular role is sorted based on the compatibility score (e.g., in descending order from highest score to lowest score). In some embodiments, the list of recommended service providers for a particular role may be limited to a fixed number (e.g., only top 20-highest scoring service providers are included).

At block 316, the processing device transmits the list of recommended service providers to the scheduling user. In some embodiments, the scheduling user can then select service providers for each role required for the litigation-related event. In response to the selection, the processing device sends job requests to the respective service providers. In some embodiments, if the scheduling user does not respond after a predefined duration (e.g., 1 hour, 2 hours, etc.), the job requests may be sent automatically. In some embodiments, particularly when timing is critical (e.g., the litigation-related event will begin in 3 days, in 2 days, within 24 hours), multiple job requests may be sent to service providers in the list of recommended service providers (e.g., the service providers having the top five highest scores). Upon acceptance of a job request by a service provider, the outstanding job requests are rescinded.

Figure 4:
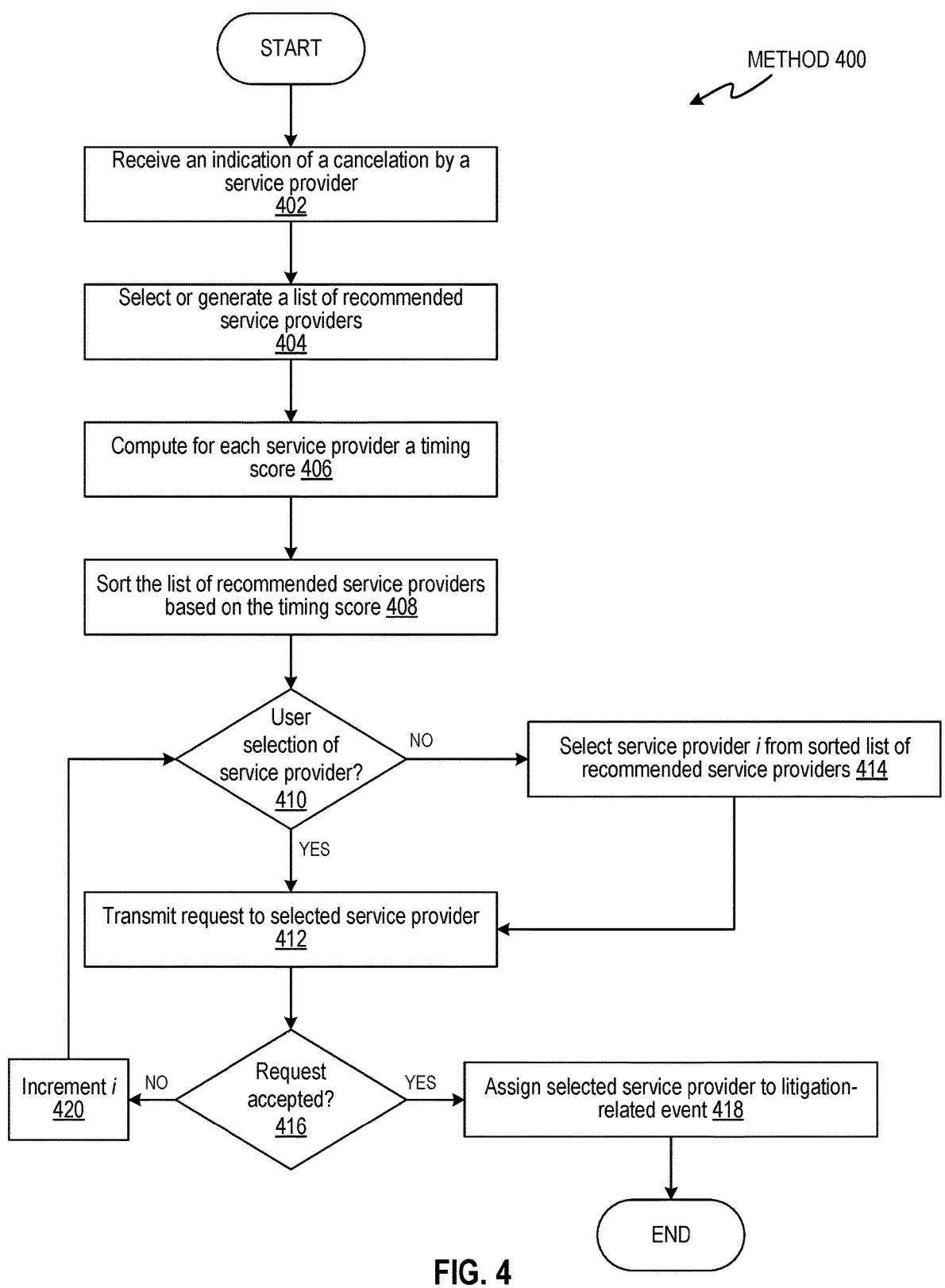
FIG. 4 is a flow diagram illustrating a method of identifying a service provider to fill an open time slot based on a timing score in accordance with embodiments of the present disclosure.

FIG. 4 is a flow diagram illustrating a method 400 of identifying a service provider to fill an open time slot based on a compatibility score in accordance with embodiments of the present disclosure. In some embodiments, the method 400 is performed in situations where there is an urgent need to assign a service provider to a particular role, for example, triggered by a service provider sending an indication canceling their participation in the litigation-related event within 3 days, 2 days, 1 day, 12 hours, 1 hour, or even up until the start of the litigation-related event. The method 400 may ensure or improve the likelihood that the scheduling user (e.g., lawyer) is not without a service provider at the time that the litigation-related event is to begin, while also improving or optimizing the earning capacity of service providers.

At block 402, a processing device (e.g., of the management server 130) receives an indication of a cancelation by a service provider. At block 404, the processing device selects a previously generated list of recommended service providers or generates a list of recommended service providers (e.g., similar to block 314 described with respect to FIG. 3). In some embodiments, the previously generated list of recommended service providers is updated to account for current availability of the service providers in the list.

At block 406, the processing device computes a timing score for each service provider in the list of recommended service providers. In some embodiments, the timing score is a measure of the likelihood that the service provider will be able to participate in the litigation-related event based on the historical timing habits of the service provider and/or the scheduling user. Various factors may be used to compute the compatibility score for a given service provider with respect to the scheduling user (e.g., lawyer), including, but not limited to: price of the service provider role (F); the expected duration of a given litigation-related event as indicated by the scheduling user (Tp); the mean actual duration of litigation-related events for service provider (Tf); an average of differences between actual durations and estimated durations of past litigation-related events (Te); the average price of last three or less jobs performed by the service provider (Ff); an average measure of timeliness or lateness, which may be derived from pinging the service provider and will have a precision based on the ping interval (OT); a critical time delay beyond which a service provider should not be late (CTD); a number of jobs denied by the service provider (DENY); a distance at which a job will likely be denied by the service provider (DENYD); a maximum number of days in advance before a scheduled litigation-related event that the service provider can accept the job (DENYT); the number of days until the litigation-related event (DD); the number of depositions scheduled by the scheduling user (N); the number of litigation-related events scheduled by the scheduling user in a week (N7); the number of litigation-related events scheduled by the scheduling user in a month (N30); the number of schedules with which the service provider has signed (Nsigned); the number of depositions the service provider has signed on a given date (FNdate); the cancelation rate for the scheduling user (C); the rebooking percentage for the scheduling user (BB); the average number of days ahead of a rebooked/rescheduled litigation-related event (DBB); the days ahead of a scheduled litigation-related event that cancellations generally occur (CDL); the number of contracts signed by the service provider (FN); the number of contracts the service provider signed on a given day of the week of the litigation-related event (FNd); the number of contracts the scheduling user (e.g., lawyer) signed (LN); the number of contracts the scheduling user signed on a given day of the week of the litigation-related event (LNd); the start time of litigation-related events that is frequent or typical for the scheduling user (ST); a distance radius, which is derived from a pattern of locations of litigation-related events scheduled by the scheduling user (DR); units of time based on a schedule blocking parameter used for service providers, which may be in increments of half-hours, hours, etc. (TF); holidays or days that the service provider does not work (Fhd); and working hours for the service provider on each day (Fwh). In some embodiments, the timing score is based at least in part on a habit profile generated for the service provider.

In some embodiments, the timing score (F_rate) may be computed according to the following equation:

$$F\_rate = a_1 \cdot Dr + a_2 \cdot Fr + a_3 \cdot Tr + a_4 \cdot TDr + a_5 \cdot Cr + a_6 \cdot DLr + a_7 \cdot DDr + a_8 \cdot NLr + a_9 \cdot Sr + a_{10} \cdot Nr + a_{11} \cdot FDi,$$

where the $a_i$ coefficients are weighting coefficients ranging from 0 to 1,
Dr=1−min(1, distance between scheduling user and service provider)/DENYD,
Fr=F_ratio(F, Ff), which is a measure of the compatibility of the price of the job posted and the service provider's price,
Tr=F_ratio(Tp, Tf), which is a measure of the litigation-related event duration and the average service provider job duration,
F_ratio(arg1, arg2) is defined such that if arg1>arg 2, the function returns $(arg2/arg1)^2$; otherwise, the function returns $(arg1/arg2)^2$,
TDr=1−min(1, OT/CTD), which is a rate of time delay of the given service provider,
Cr=1−(C−BB·(C/100)·(DBB/CDL))/100, which relates to cancelation rate,
DLr=1−min(1, DL/DENYT),
DDr=1 if DD≥DENYT, or otherwise 0,
NLr=min(N, mean(N))/mean (N), which relates to experience rate of the service provider;
Sr=DENY/NF, which relates to scheduled litigation-related event cancelation rate for the given service provider,
Nr=min(5, NF)/5, which relates to experience rate of the given service provider, and
FDi=FNd/FN.

In some embodiments, to account for the scheduling user (e.g., attorney) having little or no experience to be used in the F_rate calculation, the compatibility score can be computed based on service provider ratings that are generated using variables that are independent of the scheduling user's parameters. In some embodiments, the timing score is computed according to:

$$RF = f_1 \cdot TDr + f_2 \cdot Sr + f_3 \cdot Nr + f_4 \cdot Dr + f_5 \cdot DTr + f_6 \cdot SFr,$$

where the f coefficients are weighting coefficients ranging from 0 to 1,
DTr=DENYT/30, and
SFr=FN_date/4, which relates to congestion of a given service provider on the specified date.

In some embodiments, to account for the service providers having little or no experience to be used in the F_rate calculation, a recommended list of scheduling users to assign the service provider is based on the litigation-related event location, a scheduling-user rating ("lawyer rating"), and a ratio of litigation-related events scheduled for that scheduling user with service providers assigned versus litigation-related events without service providers assigned. In some embodiments, the lawyer rating can be compute according to:

$$RL = l_1 \cdot Cr + l_2 \cdot DLr + l_3 \cdot NLr + l_4 \cdot LN + l_5 \cdot CDLr + l_6 \cdot SLr,$$

where the $l_i$ coefficients are weighting coefficients ranging from 0 to 1,
LN=the number of contracts the given lawyer signed,
CDLr=1−min(1, CDL/DL), which relates to a measure of inconvenience in cancelation for service providers, and
SLr=1−N_signed/N, which relates to a percentage of unassigned litigation-related events among all litigation-related events scheduled by the given lawyer.

In some embodiments, F_rate may be calculated even if scheduling user or service provider information is limited. For example, if a lawyer's behavior data is limited, the processing device may derive the relevant parameters for calculating F_rate from a baseline habit profile of the lawyer (or a baseline habit profile updated to include limited behavior data for the lawyer). Similarly, if a freelancer's behavior data is limited, the processing device may derive the relevant parameters for calculating F_rate from a baseline habit profile of the freelancer (or a baseline habit profile update to include limited behavior data for the freelancer).

At block 408, the processing device sorts the list of recommended service providers based on the timing score. In some embodiments, the timing score may override the sorting of recommended service providers based on the compatibility score. For example, a list of available services providers (that are not sorted based on compatibility score) may be sorted instead based on the timing score. In some embodiments, the sorted list of recommended service providers is transmitted to the client device of the scheduling user (e.g., one of the user devices 120A-120Z), and the scheduling user may have an opportunity to select one of the service providers from the list. In some embodiments, the scheduling user is initially presented with a single service provider (the first service provider in the list at index i=1, corresponding to the service provider with the highest timing score).

At block 410, the processing device determines whether a user selection of a service provider from the sorted list of recommended service providers has been received (e.g., from the client device of the scheduling user). In some embodiments, the user selection may correspond to a confirmation from the scheduling user to select the individual service provider that has been recommended (e.g., the service provider with the highest compatibility score). If at block 410 the user selection of the service provider is received, the method 400 proceeds to block 412, where a job request to participate in the litigation-related event is sent to a client device of the selected service provider to confirm whether the service provider accepts the job request.

If at block 410 the processing device does not receive a user selection of a service provider or the processing device receives a rejection of the service provider, then the method 400 proceeds to block 414 where a service provider is selected from the sorted list of recommended service providers (e.g., the service provider at index i in the list, where i corresponds to the first service provider in the list the first time that block 410 is performed). In some embodiments, if the litigation-related event is scheduled to begin within a short period of time (e.g., within 3 days, within 1 day, within 12 hours, etc.), the processing device may determine that a user selection has not been received if no response has been received from the scheduling user within a predefined duration (e.g., 1 hour, 30 minutes, 5 minutes, etc.) depending on the proximity of the litigation-related event.

At block 416, the processing device determines whether the job request was accepted by the service provider to whom the job request was sent. If at block 416 the processing device determines that the job request was accepted, the method 400 proceeds to block 418, where the processing device assigns the service provider to the litigation-related event and updates the service provider's schedule accordingly. In some embodiments, all other pending job requests for service providers for that same role are canceled. If at block 416, the processing device determines that the job request was denied or not accepted within a predetermined time (e.g., 5 minutes, 30 minutes, one hour, 5 hours, etc.), the processing device proceeds to block 420 and increments the index i to select the next service provider in the sorted list of recommended service providers, and the method may then proceed back to block 410. In some embodiments, blocks 410, 412, 414, 416, and 420 are iterated through until service providers are assigned to all required roles for the litigation-related event.

Figure 5:
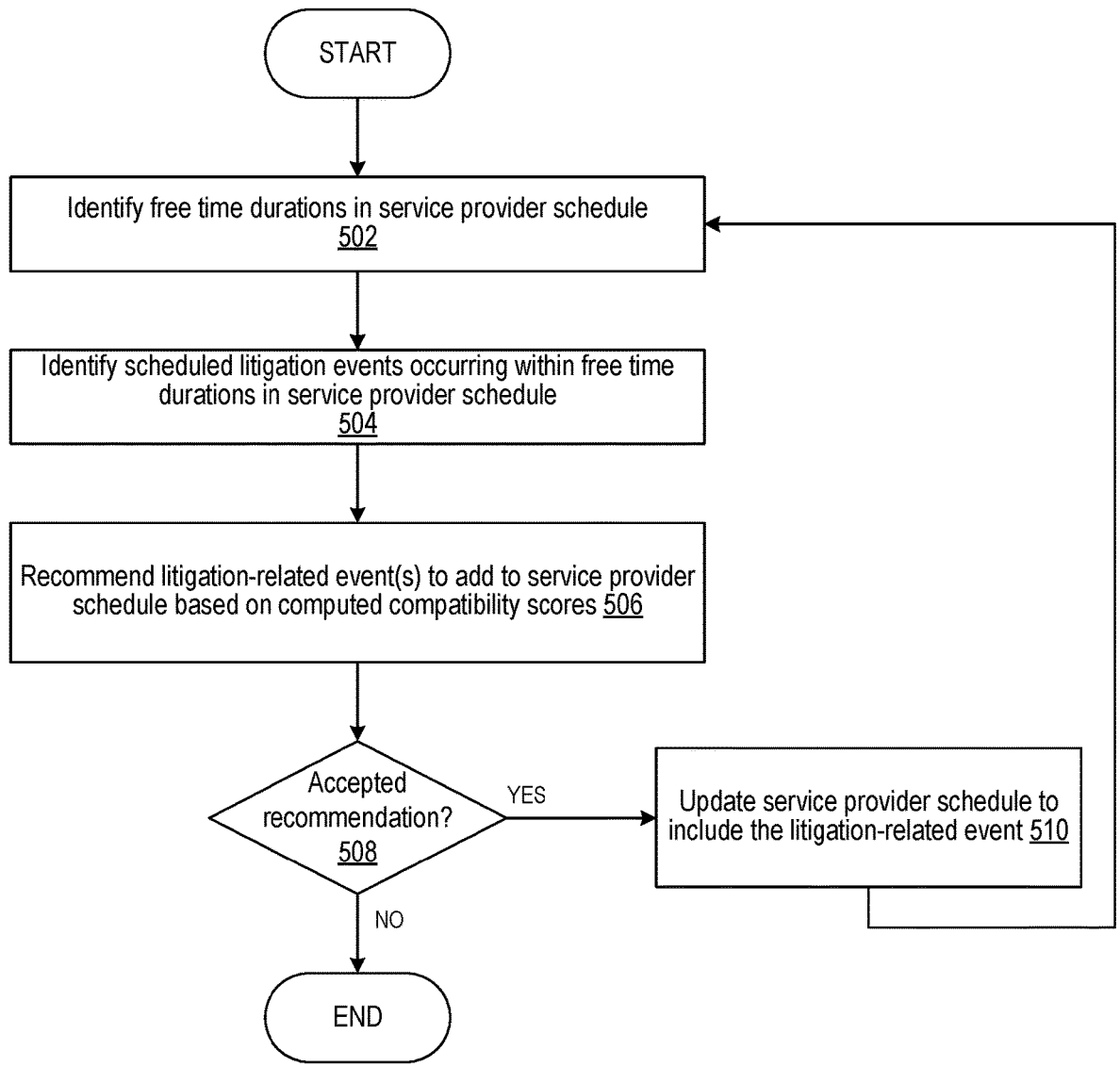
FIG. 5 is a flow diagram illustrating a method of updating a service provider schedule in accordance with embodiments of the present disclosure.

FIG. 5 is a flow diagram illustrating a method 500 of updating a service provider schedule in accordance with embodiments of the present disclosure. The method 500 may be performed for each user designated as a service provider to generate optimal or near-optimal scheduling recommendations. In some embodiments, each service provider can be recommended for a given litigation-related event (scheduled by a scheduling user) when that litigation-related event is actually scheduled and when the service provider has a free time duration in the working hours of their schedule to accommodate the litigation-related event including a buffer period (e.g., estimated deposition duration padded by 15-30 minute periods for travel, setup, etc.). In some embodiments, the recommendations of individual service providers will be based on a compatibility score and/or a timing score. The method 500 facilitates the optimization of service provider schedules by minimizing unused time for the purpose of increasing or maximizing earning capacity under the circumstances.

At block 502, a processing device (e.g., of the management server 130) identifies free time durations in a service provider schedule. In some embodiments, the durations occur between discrete blocks of time corresponding to other scheduled events, working hour bounds, holidays, etc.

In some embodiments, an unscheduled duration between scheduled durations may not be identified as a free time duration if it is below a threshold time duration so as to reduce the possibility of conflicts (e.g., a time duration less than 30 minutes or less than an hour). In some embodiments, an unscheduled duration that may be able to accommodate a particular litigation-related event may not be identified as a free time duration for another litigation-related event for geographic or logistical reasons. For example, while the time duration may accommodate the litigation-related event, the processing device may determine based on estimated travel time, traffic delays, etc. that a conflict would likely arise with respect to litigation-related events or other scheduled engagements before or after the duration in question. In such embodiments, the processing device may make a determination as to whether an unscheduled time duration should be identified as a free time duration based on adjacently scheduled events in combination with a geographic and/or logistic relationship (e.g., estimated travel time derived, for example, from traffic data, flight delay data, etc.) between the given litigation-related event and a location of the service provider while attending the adjacently scheduled events.

At block 504, the processing device identifies scheduled litigation-related events occurring within the free time durations in the service provider schedule. In some embodiments, the litigation-related events are identified as those having an estimated duration that fits within the free time duration. In some embodiments, the estimated duration may be computed based on a habit profile of the scheduling user (e.g., an attorney based on data describing actual durations of prior litigation-related events scheduled by that attorney).

At block 506, the processing device generates a recommendation of one or more litigation-related events to add to the service provider schedule based, for example, on a computed timing score between the service provider and the scheduling user (for example, if there is urgency in filling unassigned roles for the litigation-related events, as described with respect to FIG. 4). In some embodiments, the recommendation for a particular litigation-related event is generated based on the service provider's position within a list of recommended service providers (for example, as described with respect to FIG. 3).

In some embodiments, the recommendation of one or more litigation-related events may be based on a demand prediction model. The demand prediction model may identify and predict periods of high demand for service providers taking into account, for example, the number of active lawyers during particular time periods and the number of scheduled litigation-related events in those time periods. The demand prediction model may further utilize, as a target variable, an average number of litigation-related events per active lawyer that are expected to not be canceled or to be canceled and rebooked, which may be used to predict the need for service providers and tailor recommendations accordingly.

At block 508, the processing device determines whether the recommendation was accepted by the scheduling user. If at block 508 the recommendation was accepted by the scheduling user, the method 500 proceeds to block 510 where the service provider schedule is updated to include the litigation-related event to include an indicator that time has been allocated for the litigation-related event in the service provider schedule. In some embodiments, a request is sent to the user device of the service provider to determine if they wish to accept the role, and the litigation-related event will be scheduled in the service provider schedule in response to their acceptance.

In some embodiments, once the litigation-related event is added to the service provider schedule, the method 500 may proceed back to block 502 to repeat one or more blocks of the method 500 based on the updated service provider schedule. In some embodiments, in response to an update to the service provider schedule, the processing device may further update one or more lists of available service providers and/or one or more lists of recommended service providers (e.g., generated for other litigation-related events) that include the service provider based on the updated availability of the service provider.

If at block 508 the recommendation is not accepted by the scheduling user, the method 500 ends and may repeat periodically, for example, starting from block 502 or block 504.

Figure 6:
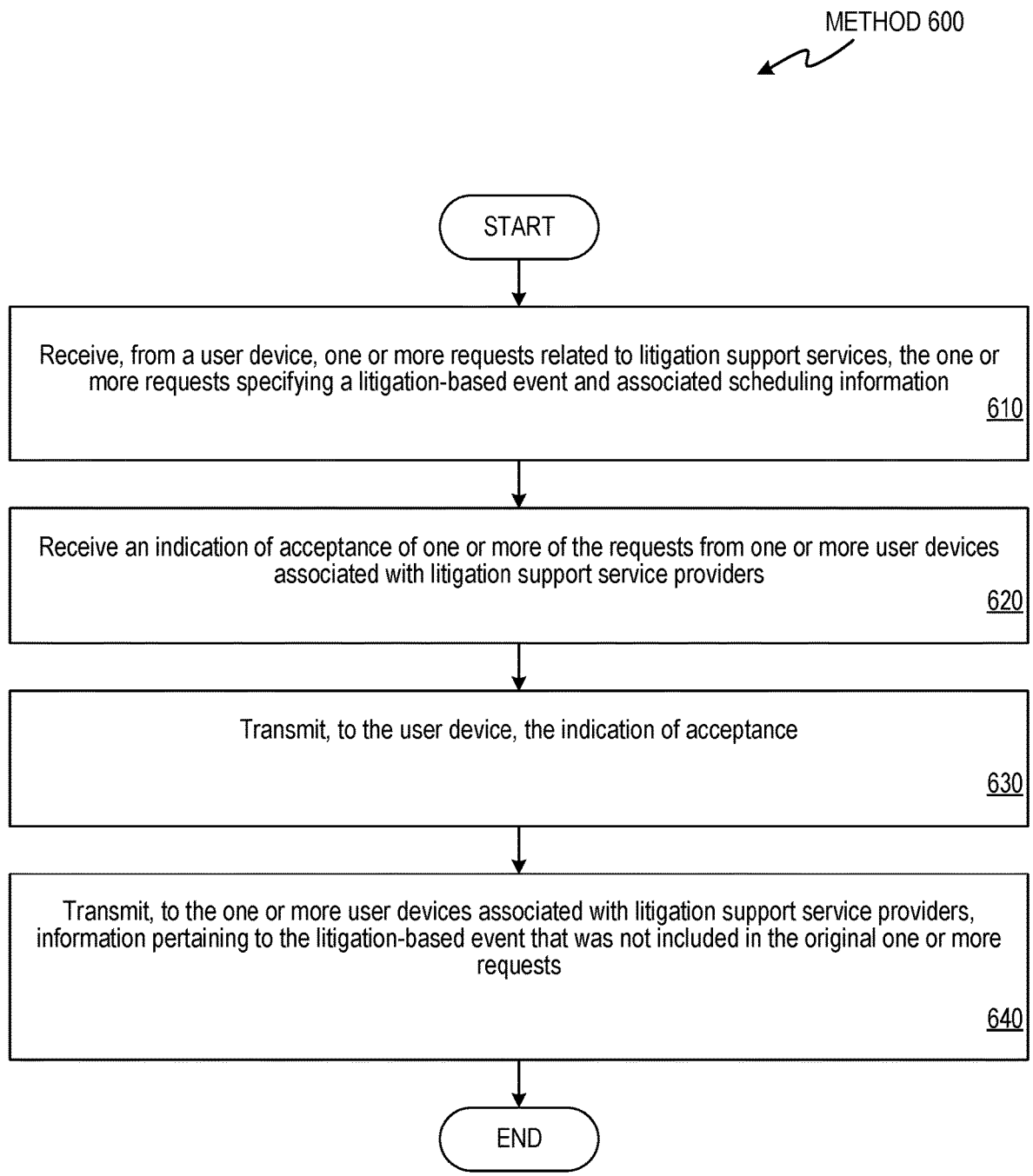
FIG. 6 is a flow diagram illustrating a method of managing litigation support data in accordance with embodiments of the present disclosure.

FIG. 6 is a flow diagram 600 illustrating a method of managing litigation support data in accordance with embodiments of the present disclosure. At block 610, a processing device (e.g., of the management server 130) receives, from a user device, one or more requests related to litigation support services. The one or more requests specify a litigation-related event and associated scheduling information.

At block 620, the processing device receives an indication of acceptance of one or more of the requests from one or more user devices associated with litigation support service providers. In some embodiments, the litigation support service providers are selected from a group consisting of court reporters, videographers, video technicians, interpreters, and scopists. In some embodiments, one or more requests are transmitted to one or more user devices associated with litigation support service providers based on a compatibility score computed for each of the litigation support service providers (e.g., as discussed with respect to the method 300).

At block 630, the processing device transmits, to the user device, the indication of acceptance. At block 640, the processing device transmits, to the one or more user devices associated with litigation support service providers, information pertaining to the litigation-related event that was not included in the original one or more requests.

In some embodiments, the processing device transmits information descriptive of a geographic location of the one or more litigation support service providers with respect to a geographic location of the litigation-related event.

In some embodiments, the processing device generates, based at least partially on the information pertaining to the litigation-related event, a pre-populated read-on form for at least one of the litigation support service providers. For example, the pre-populated read-on form may include a statement that the litigation support service provider is to read during the litigation-related event, which may be pre-populated with data related to the litigation-related event prior to the beginning of the litigation-related event. The processing device may then transmit the pre-populated read-on form to the respective user device of the at least one of the litigation support service providers to be displayed by the user device during the litigation-related event.

In some embodiments, the processing device detects an update to data associated with the litigation-related event, and, in response, transmits in real time the updated data to the user device and/or the user devices associated with the litigation support service providers.

In some embodiments, the processing device transmits to the user device one or more deliverables generated by the litigation support service providers.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring instructions for performing such methods to computing devices. The term "article of manufacture," as used herein, is intended to encompass a computer program accessible from any computer-readable device or storage media.

Figure 7:
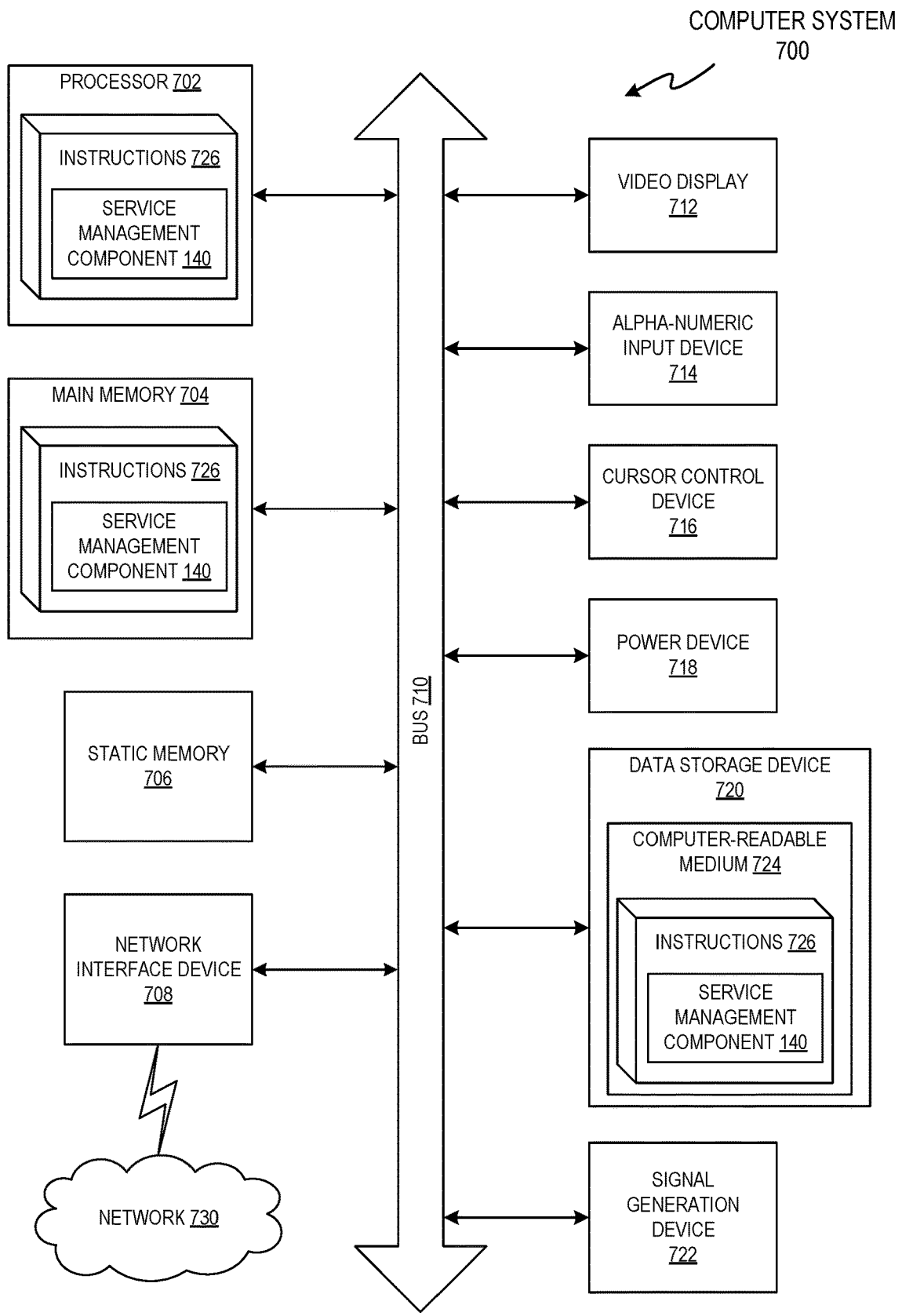
FIG. 7 illustrates an exemplary computer system for use in accordance with embodiments of the present disclosure.

FIG. 7 illustrates a diagrammatic representation of a machine in the exemplary form of a computer system 700 within which a set of instructions (e.g., for causing the machine to perform any one or more of the methodologies discussed herein) may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 700 may be utilized by or illustrative of any of the devices of the system architecture 100, such as the data store 110, one or more of the user devices 120A-120Z, and the management server 130.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 720, which communicate with each other via a bus 710.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an ASIC, a field programmable gate array (FPGA), a digital signal processor (DSP), network processor, or the like. The processor 702 is configured to execute instructions 726 for performing the operations and steps discussed herein.

The computer system 700 may further include a network interface device 708. The computer system 700 also may include a video display unit 712 (e.g., a liquid crystal display (LCD), a cathode ray tube (CRT), or a touch screen), an alphanumeric input device 714 (e.g., a keyboard), a cursor control device 716 (e.g., a mouse), and a signal generation device 722 (e.g., a speaker).

Power device 718 may monitor a power level of a battery used to power the computer system 700 or one or more of its components. The power device 718 may provide one or more interfaces to provide an indication of a power level, a time window remaining prior to shutdown of computer system 700 or one or more of its components, a power consumption rate, an indicator of whether computer system is utilizing an external power source or battery power, and other power related information. In some embodiments, indications related to the power device 718 may be accessible remotely (e.g., accessible to a remote back-up management module via a network connection). In some embodiments, a battery utilized by the power device 718 may be an uninterruptable power supply (UPS) local to or remote from computer system 700. In such embodiments, the power device 718 may provide information about a power level of the UPS.

The data storage device 720 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 730 (e.g., the network 105) via the network interface device 708.

In one embodiment, the instructions 726 include instructions for a service management component 140, as described with respect to FIG. 1 and throughout this disclosure. For example, the service management component 140 may be implemented by the management server 130 or the user devices 120A-120Z. While the computer-readable storage medium 724 is shown in an exemplary embodiment to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "configuring," "receiving," "converting," "causing," "streaming," "applying," "masking," "displaying," "retrieving," "transmitting," "computing," "generating," "adding," "subtracting," "multiplying," "dividing," "selecting," "parsing," "optimizing," "calibrating," "detecting," "storing," "performing," "analyzing," "determining," "enabling," "identifying," "modifying," "transforming," "aggregating," "extracting," "running," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an embodiment" or "one embodiment" means that a particular feature, structure, or characteristic described in connection with the embodiment is included in at least one embodiment. Thus, the appearances of the phrase "an embodiment" or "one embodiment" in various places throughout this specification are not necessarily all referring to the same embodiment. Moreover, it is noted that the "A-Z" notation used in reference to certain elements of the drawings is not intended to be limiting to a particular number of elements. Thus, "A-Z" is to be construed as having one or more of the element present in a particular embodiment.

The present disclosure is not to be limited in scope by the specific embodiments described herein. Indeed, other various embodiments of and modifications to the present disclosure, in addition to those described herein, will be apparent to those of ordinary skill in the art from the description and accompanying drawings. Thus, such other embodiments and modifications are intended to fall within the scope of the present disclosure. Further, while the present disclosure has been described in the context of a particular embodiment in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A method of implementing a platform for managing litigation support services, the method comprising:
   training, using historical user behavior data or litigation-related event outcome data as inputs, one or more machine learning models to build one or more baseline habit profiles representative of behavior predictions of users of the platform;
   receiving, from a user device of a scheduling user, a request related to litigation support services to assign a litigation support service provider to a role associated with a litigation-related event, the request specifying the litigation-related event and associated scheduling information;
   generating or retrieving a list of recommended litigation support service providers;
   receiving location information from devices of the recommended litigation support service providers;
   computing, for each litigation support service provider in the list, a timing score representative of a likelihood that the litigation support service provider will be able to participate in the litigation-related event, wherein each timing score is derived at least in part from an availability of the litigation support service provider, the received location information, and the one or more baseline habit profiles associated with the litigation support service provider and/or the scheduling user for which historical user behavior data for the litigation support service provider and/or the scheduling user is missing;
   sorting the list in descending order based on the computed timing scores;
   transmitting a request to the first litigation support service provider in the list;
   responsive to receiving confirmation from the first litigation support service provider, transmitting, to one or more user devices associated with the first litigation support service provider, information pertaining to the litigation-related event that was not included in the original request;
   receiving real-time location information from one or more user devices associated with the first litigation support service provider at one or more ping intervals while the first litigation support service provider is en route to the location of the litigation-related event;
   deriving a measure of timeliness or lateness for the first litigation support service provider from the real-time location information based on the one or more ping intervals; and
   implementing the one or more machine learning models to update the one or more baseline habit profiles associated with the first litigation support service provider and/or the scheduling user based on actions taken by the first litigation support service provider and/or the scheduling user, respectively, related to the litigation-related event, wherein the one or more baseline habit profiles are updated based on the measure of timeliness or lateness derived for the first litigation support service provider.

2. The method of claim 1, wherein the litigation support service providers are selected from a group consisting of court reporters, videographers, video technicians, interpreters, and scopists.

3. The method of claim 1, further comprising:
   transmitting, to the user device, information descriptive of a geographic location of the one or more litigation support service providers with respect to a geographic location of the litigation-related event.

4. The method of claim 1, further comprising:
   generating, based at least partially on the information pertaining to the litigation-related event, a pre-populated read-on form for at least the first litigation support service provider; and
   transmitting the pre-populated read-on form to the one or more user devices associated with the first litigation support service provider to be displayed by the one or more user devices during the litigation-related event.

5. The method of claim 1, further comprising:
   detecting an update to data associated with the litigation-related event; and
   transmitting in real time the updated data to the user device and/or the user devices associated with the litigation support service providers.

6. The method of claim 1, further comprising:
transmitting to the user device one or more deliverables generated by the litigation support service providers.

7. A system for implementing a platform for managing litigation support services, the system comprising:
a memory;
a processing device operatively coupled to the memory, wherein the processing device is configured to:
train, using historical user behavior data or litigation-related event outcome data as inputs, one or more machine learning models to build one or more baseline habit profiles representative of behavior predictions of users of the platform;
receive, from a user device of a scheduling user, a request related to litigation support services to assign a litigation support service provider to a role associated with a litigation-related event, the request specifying the litigation-related event and associated scheduling information;
generate or retrieve a list of recommended litigation support service providers;
receive location information from devices from the recommended litigation support service providers;
compute, for each litigation support service provider in the list, a timing score representative of a likelihood that the litigation support service provider will be able to participate in the litigation-related event, wherein each timing score is derived at least in part from an availability of the litigation support service provider, the received location information, and the one or more baseline habit profiles associated with the litigation support service provider and/or the scheduling user for which historical user behavior data for the litigation support service provider and/or the scheduling user is missing;
sort the list in descending order based on the computed timing scores;
transmit a request to the first litigation support service provider in the list;
responsive to receiving confirmation from the first litigation support service provider, transmit, to one or more user devices associated with the first litigation support service provider, information pertaining to the litigation-related event that was not included in the original request;
receive real-time location information from one or more user devices associated with the first litigation support service provider at one or more ping intervals while the first litigation support service provider is en route to the location of the litigation-related event:
derive a measure of timeliness or lateness for the first litigation support service provider from the real-time location information based on the one or more ping intervals; and
implement the one or more machine learning models to update the one or more baseline habit profiles associated with the first litigation support service provider and/or the scheduling user based on actions taken by the first litigation support service provider and/or the scheduling user, respectively, related to the litigation-related event, wherein the one or more baseline habit profiles are updated based on the measure of timeliness or lateness derived for the first litigation support service provider.

8. The system of claim 7, wherein the litigation support service providers are selected from a group consisting of court reporters, videographers, video technicians, interpreters, and scopists.

9. The system of claim 7, wherein the processing device is further configured to:
transmit, to the user device, information descriptive of a geographic location of the one or more service providers with respect to a geographic location of the litigation-related event.

10. The system of claim 7, wherein the processing device is further configured to:
generate, based at least partially on the information pertaining to the litigation-related event, a pre-populated read-on form for at least the first litigation support service provider; and
transmit the pre-populated read-on form to the one or more user devices associated with the first litigation support service provider to be displayed by the one or more user devices during the litigation-related event.

11. The system of claim 7, wherein the processing device is further configured to:
detect an update to data associated with the litigation-related event; and
transmit in real time the updated data to the user device and/or the user devices associated with the litigation support service providers.

12. The system of claim 7, wherein the processing device is further configured to:
transmit to the user device one or more deliverables generated by the litigation support service providers.

13. A non-transitory computer-readable medium having instructions encoded thereon that, when executed by a processing device, cause the processing device to:
train, using historical user behavior data or litigation-related event outcome data as inputs, one or more machine learning models to build one or more baseline habit profiles representative of behavior predictions of users of a platform for managing litigation support services;
receive, from a user device of a scheduling user, a request related to litigation support services to assign a litigation support service provider to a role associated with a litigation-related event, the request specifying the litigation-related event and associated scheduling information;
generate or retrieve a list of recommended litigation support service providers;
receive location information from devices of the recommended litigation support service providers;
compute, for each litigation support service provider in the list, a timing score representative of a likelihood that the litigation support service provider will be able to participate in the litigation-related event, wherein each timing score is derived at least in part from an availability of the litigation support service provider, the received location information, and the one or more baseline habit profiles associated with the litigation support service provider and/or the scheduling user for which historical user behavior data for the litigation support service provider and/or the scheduling user is missing;
sort the list in descending order based on the computed timing scores;
transmit a request to the first litigation support service provider in the list;

responsive to receiving confirmation from the first litigation support service provider, transmit, to one or more user devices associated with the first litigation support service provider, information pertaining to the litigation-related event that was not included in the original request;

receive real-time location information from one or more user devices associated with the first litigation support service provider at one or more ping intervals while the first litigation support service provider is en route to the location of the litigation-related event;

derive a measure of timeliness or lateness for the first litigation support service provider from the real-time location information based on the one or more ping intervals; and implement the one or more machine learning models to update the one or more baseline habit profiles associated with the first litigation support service provider and/or the scheduling user based on actions taken by the first litigation support service provider and/or the scheduling user, respectively, related to the litigation-related event, wherein the one or more baseline habit profiles are updated based on the measure of timeliness or lateness derived for the first litigation support service provider.

14. The non-transitory computer-readable medium of claim 13, wherein the litigation support service providers are selected from a group consisting of court reporters, videographers, video technicians, interpreters, and scopists.

15. The non-transitory computer-readable medium of claim 13, wherein the instructions further cause the processing device to:

transmit, to the user device, information descriptive of a geographic location of the one or more litigation support service providers with respect to a geographic location of the litigation-related event.

16. The non-transitory computer-readable medium of claim 13, wherein the instructions further cause the processing device to:

generate, based at least partially on the information pertaining to the litigation-related event, a pre-populated read-on form for at least the first litigation support service provider; and transmit the pre-populated read-on form to the one or more user devices associated with the first litigation support service provider to be displayed by the one or more user devices during the litigation-related event.

17. The non-transitory computer-readable medium of claim 13, wherein the instructions further cause the processing device to:

detect an update to data associated with the litigation-related event; and transmit in real time the updated data to the user device and/or the user devices associated with the litigation support service providers.

* * * * *